(12) United States Patent
Tai

(10) Patent No.: US 7,319,557 B2
(45) Date of Patent: Jan. 15, 2008

(54) FUSED THERMAL AND DIRECT VIEW AIMING SIGHT

(75) Inventor: Anthony M. Tai, Northville, MI (US)

(73) Assignee: EOTech Acquisition Corporation, Ann Arbor, MI (US)

( * ) Notice: Subject to any disclaimer, the term of this patent is extended or adjusted under 35 U.S.C. 154(b) by 155 days.

(21) Appl. No.: 11/043,627

(22) Filed: Jan. 26, 2005

(65) Prior Publication Data

US 2006/0164718 A1    Jul. 27, 2006

(51) Int. Cl.
*G02B 23/00* (2006.01)
*G02B 27/10* (2006.01)

(52) U.S. Cl. .............. 359/399; 359/350; 359/431; 359/618

(58) Field of Classification Search ........ 359/350–361, 359/399–432, 618–641; 250/330–336
See application file for complete search history.

(56) References Cited

U.S. PATENT DOCUMENTS

| | | | | |
|---|---|---|---|---|
| 3,509,344 A | * | 4/1970 | Bouwers ............... 250/333 |
| 3,905,708 A | | 9/1975 | Steck, III ............. 356/251 |
| 4,786,966 A | * | 11/1988 | Hanson et al. ........ 348/158 |
| 4,863,269 A | * | 9/1989 | Ellis .................. 356/251 |
| 5,035,472 A | * | 7/1991 | Hansen ............... 359/350 |
| 5,084,780 A | * | 1/1992 | Phillips .............. 359/350 |
| 5,414,557 A | * | 5/1995 | Phillips .............. 359/428 |
| 5,483,362 A | | 1/1996 | Tai et al. .............. 359/1 |
| 5,534,696 A | * | 7/1996 | Johansson et al. ...... 250/330 |
| 5,815,936 A | | 10/1998 | Sieczka et al. ......... 42/115 |
| 6,204,961 B1 | * | 3/2001 | Anderson et al. ....... 359/353 |
| 6,490,060 B1 | | 12/2002 | Tai et al. ............. 359/15 |
| 6,762,884 B2 | * | 7/2004 | Beystrum et al. ....... 359/629 |
| 6,911,652 B2 | * | 6/2005 | Walkenstein .......... 250/330 |
| 2007/0013997 A1 | * | 1/2007 | Zadravec et al. ....... 359/353 |

FOREIGN PATENT DOCUMENTS

| | | | | |
|---|---|---|---|---|
| EP | 548 625 | * | 6/1993 | ........... 359/353 |
| GB | 2 143 397 | * | 2/1985 | ........... 359/350 |
| GB | 2 149 141 | * | 6/1985 | ........... 359/353 |

* cited by examiner

*Primary Examiner*—Thong Q Nguyen
(74) *Attorney, Agent, or Firm*—Brooks Kushman P.C.

(57) ABSTRACT

A fused thermal and a direct view aiming sight includes an optical gun sight, a thermal sight, and a beam combiner. The optical sight generates a direct view image of an aiming point or reticle superimposed on a target scene. The thermal sight generates a monochromic thermal image of the target scene. The combiner is positioned behind a 1× non-magnified optical sight and the thermal sight and in front of an exit pupil of the thermal sight. The combiner is positioned right behind the intermediate image plane of a magnified optical sight between an objective lens and an eyepiece. The combiner passes the direct view image and reflects the thermal image to the exit pupil to fuse the thermal image onto the direct view image for an operator to see at the exit pupil as a combined thermal and direct view optical image of the target scene together with the aiming reticle.

18 Claims, 2 Drawing Sheets

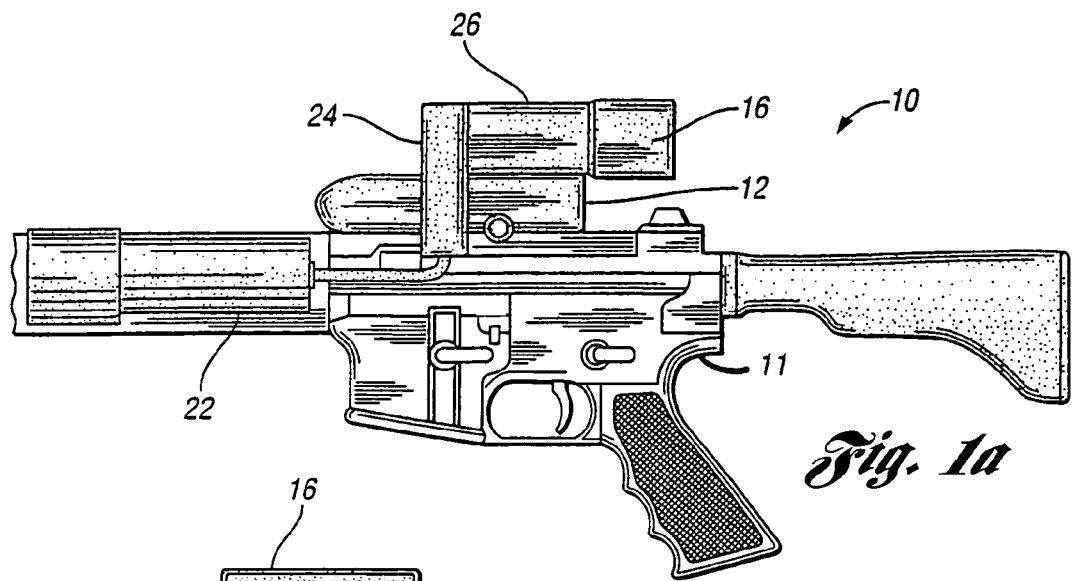
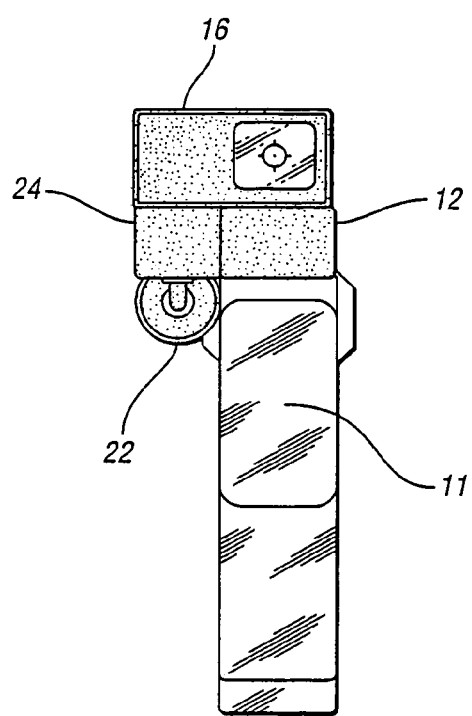
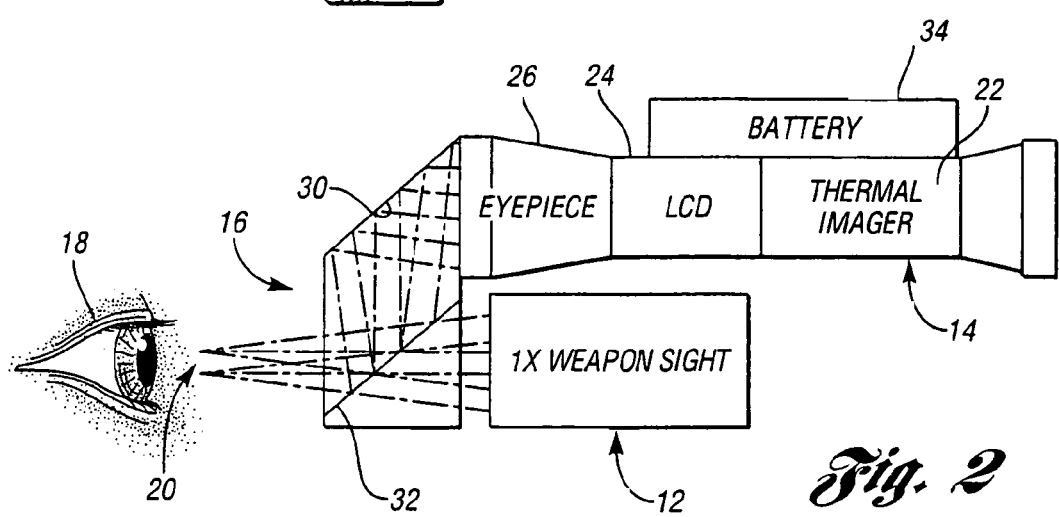

FUSED THERMAL AND DIRECT VIEW AIMING SIGHT

BACKGROUND OF THE INVENTION

1. Field of the Invention

The present invention generally relates to aiming sights for use with firearms and, more particularly, to a fused thermal and a direct view aiming sight.

2. Background Art

Conventional aiming sights superimpose an aiming reticle on the view of a target scene for the use of firearms during the day-time. For the use of guns, such conventional aiming sights include non-magnified (1×) aiming sights such as a reflex (red-dot) aiming sight as taught in U.S. Pat. No. 3,905,708; and also include holographic aiming sights as taught in U.S. Pat. Nos. 5,483,362 and 6,490,060. For the use of rifles, such conventional aiming sights include magnified aiming sights such as a rifle scope.

Conventional aiming sights for night-time use of firearms typically include a thermal imager, an image intensified night vision tube, or a low-light CCD sensor. The target scenes provided by these night-time use aiming sights are displayed on a screen together with an electronically generated reticle.

A visible imaging sensor such as a CCD sensor or an image intensifier tube provides high image resolution and a familiar view (i.e., visible/near IR electronic image) of the target. However, a well-camouflaged target can be difficult for the CCD sensor to detect because camouflages are designed to blend into the background in the visible to near infrared (400 nm to 900 nm) spectral region. A thermal imager operating in the LWIR (8 μm to 12 μm) spectral range can detect warm well-camouflaged bodies such as human beings. However, target identification (e.g., friend or foe) with a thermal imager is difficult. The thermal imager provides a thermal electronic image or map of the target at modest resolution which is quite unlike the familiar visible image. Attempts have been made to combine a CCD sensor and a thermal imager in order to fuse the visible/near IR and thermal electronic images in order to combine the strengths of the CCD sensor and the thermal imager.

CCD video sensors and image displays have limited resolution and dynamic range. The amount of information conveyed is a fraction of the information provided by the human eye. Moreover, target aiming by looking at a display screen is indirect and relatively slower than by looking through a conventional aiming sight. This is particularly true in close quarter battles where a 1× electronic sight such as a holographic aiming sight or a red-dot aiming sight allows an operator to keep both eyes open and focused at the target scene.

SUMMARY OF THE INVENTION

Accordingly, it is an object of the present invention to provide a fused thermal and a direct view aiming sight.

It is another object of the present invention to provide an aiming sight having a thermal imaging sight and an optical gun sight.

It is a further object of the present invention to provide an aiming sight which provides an image display having a thermal image superimposed on a direct view image.

It is still another object of the present invention to provide an aiming sight having a thermal imager for providing a thermal image and a magnified optical weapon sight for providing a direct view image in which the thermal image and the direct view image are combined such that an operator sees the two images superimposed on one another.

It is still yet another object of the present invention to provide an aiming sight having a thermal imaging sight and an optical gun sight to generate a superimposed thermal and direct view image for an operator to see.

It is still yet a further object of the present invention to provide an aiming sight system having a fused thermal and a direct view aiming sight which function with a night-vision scope to provide a light-intensified superimposed thermal and direct view image for an operator to see during night-time use.

The aiming sight in accordance with the present invention generally fuses a thermal image display with a direct image viewed through a conventional weapon sight. The red or amber color monochromic thermal image cues all the warm targets in the field of the direct view image of the weapon sight. An operator can then interrogate the cued targets to determine threats and engage the targets if needed.

In carrying out the above objects and other objects, the present invention provides an aiming sight having an optical gun sight, a thermal image sight assembly, and a spectral beam combiner assembly. The optical gun sight generates a direct view image of an aiming point or reticle superimposed on a target scene. The thermal image sight assembly generates a thermal image of the target scene. The spectral beam combiner assembly is positioned behind the optical gun sight and the thermal image sight assembly and is positioned in front of an exit pupil. The spectral beam combiner assembly receives and passes the direct view image from the optical gun sight to the exit pupil and receives and reflects the thermal image from the thermal image sight assembly to the exit pupil such that the thermal image is superimposed onto the direct view image of the optical gun sight for an operator to see as a superimposed thermal and direct view image when the operator positions an eye at the exit pupil.

In one embodiment, the beam combiner assembly includes a folding mirror and a spectral beam reflector. The mirror is generally positioned behind the thermal image sight assembly. The reflector is generally positioned behind the optical gun sight and in front of the exit pupil. The mirror receives and reflects the thermal image from the thermal image sight assembly to the reflector. The reflector passes the direct view image from the optical gun sight to the exit pupil and reflects the thermal image from the mirror to the exit pupil in order to superimpose the thermal image onto the direct view image of the optical gun sight for the operator to see as a superimposed image composed of a monochromic thermal image and a direct view image of the target scene together with the aiming reticle.

In one embodiment, the thermal image assembly includes a thermal imager, a liquid crystal display (LCD), and a long eye relief eyepiece. The thermal imager generates the thermal image of the target scene. The LCD displays the thermal image as a monochromic image, and the relief eyepiece provides the thermal image displayed by the LCD to the mirror for the mirror to reflect to the reflector.

The reflector is a narrow-band spectral reflector which is tuned to reflect the wavelength of the thermal image received from the mirror to the exit pupil while allowing any other light of other wavelengths to pass. The thermal imager includes a narrow-band light emitting diode (LED) to illuminate the LCD screen. The LCD displays the thermal image as a monochromic image on the LCD screen. The brightness of the LED is controllable in order to match brightness of the thermal image with brightness of the direct view image such that the superimposed thermal and direct view image has an even brightness.

The thermal image data can be processed such that the thermal image includes targets in the target scene which have a temperature falling within a given temperature range and excludes all other targets in the target scene. The thermal imager and the LCD are controllable to be turned-off such that the direct view image provided from the optical gun sight is passed to the exit pupil without a thermal image superimposed thereon when the thermal image sight assembly is turned-off.

A focal length of the thermal imager, a size of the LCD, and a magnification of the eyepiece can be selected such that the thermal image is made to be the same angular size as the direct view image in order for the superimposed thermal and direct view image to have an even size.

The system can be used at night with an image intensified night vision device if the brightness of the LCD screen and the brightness of the aiming reticle of the direct view sight can both be dimmed to a level that can be used with an image intensified night vision device. The brightness of the LED used to illuminate the LCD screen can be reduced to a very low level by controlling the driving voltage and the use of pulse width modulation. The effective brightness of the display is proportional to the product of the driving voltage and the duty cycle of the pulse width modulation. For example, a 200-to-1 voltage adjustment range together with a 10,000-to-1 range in the modulation duty cycle produce a total brightness adjustment range of 2,000,000-to-1.

The optical gun sight may be either a night vision device compatible non-magnified reflex optical sight or a holographic optical sight in which brightness of the aiming reticle is adjustable over a wide range. A night-vision scope may be positioned at the exit pupil of the optical gun sight. The night-vision scope light-intensifies the superimposed thermal and direct view image for night-time use of the aiming sight.

The above objects and other objects, features, and advantages of the present invention are readily apparent from the following detailed description of the preferred embodiment(s) when taken in connection with the accompanying drawings.

BRIEF DESCRIPTION OF THE DRAWINGS

FIG. 1a illustrates a side perspective view of a fused thermal and a direct view aiming sight in accordance with the present invention mounted on a firearm;

FIG. 1b illustrates a backside perspective view of the aiming sight and the firearm shown in FIG. 1a;

FIG. 2 illustrates a conceptual drawing of the fused thermal and the direct view aiming sight in accordance with the present invention;

DETAILED DESCRIPTION OF THE PREFERRED EMBODIMENT(S)

Figure 3:
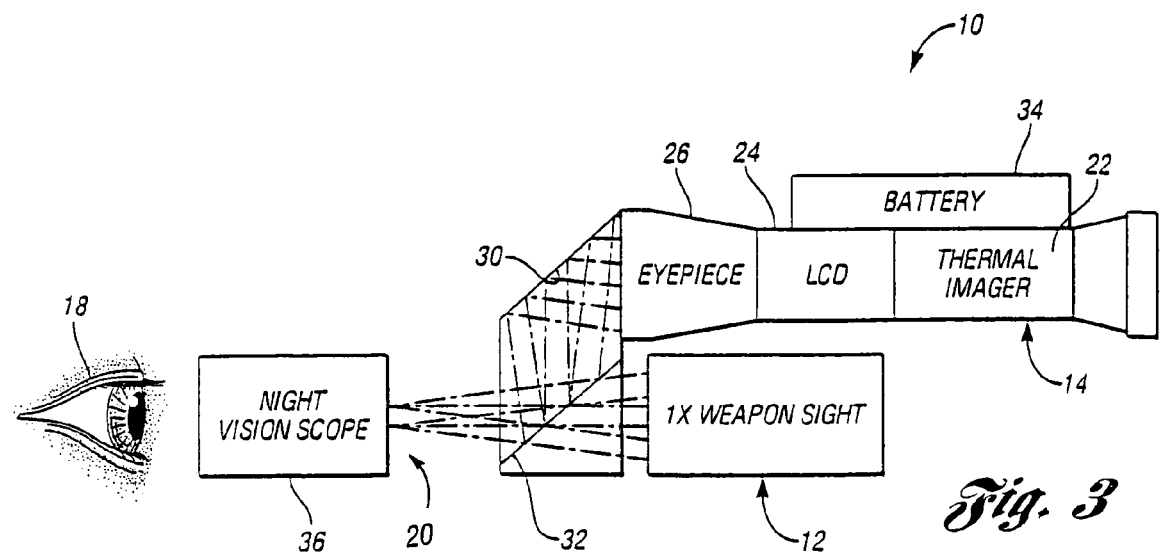
FIG. 3 illustrates a conceptual drawing of the fused thermal and the direct view aiming sight used with a night-vision scope or goggle for operation at night in accordance with the present invention.

Referring now to FIG. 1, a fused thermal and a direct view aiming sight 10 in accordance with an embodiment of the present invention mounted on a firearm 11 is shown. It is to be appreciated that the aiming sight in accordance with the present invention may be similarly mounted on other firearms such as carbines and machine guns.

Referring now to FIG. 2, with continual reference to FIG. 1, a conceptual drawing of fused thermal and direct view aiming sight 10 is shown. As shown in FIGS. 1 and 2, aiming sight 10 generally includes an optical gun sight 12, a thermal image sight assembly 14, and a spectral beam combiner assembly 16.

Optical gun sight 12 is a conventional gun sight for use in close quarters may be a non-magnified (1×) reflex (red-dot) gun sight as taught in U.S. Pat. No. 3,905,708 which is hereby incorporated by reference in its entirety. Alternatively, optical gun sight 12 may be a holographic gun sight as taught in U.S. Pat. Nos. 5,483,362 and 6,490,060, which are both hereby incorporated by reference in their entirety. In operation, optical gun sight 12 superimposes an aiming point (i.e., aiming reticle) on the view of a target scene. The non-magnified optical gun sight has unlimited eye relief and the aiming reticle and the target from any position behind the optical gun sight. As such, optical gun sight 12 provides a direct view image which is viewed through the optical gun sight.

Thermal image sight assembly 14 generally includes a thermal sensor or imager 22, a monochromic liquid crystal display (LCD) 24 illuminated by a light emitting diode (LED), and a long eye relief eyepiece 26. Thermal imager 22 is preferably an un-cooled micro-bolometer array thermal imager. Thermal imager 22 includes thermal imaging processing electronics and a thermal sight for generating a thermal image of a target scene. LCD 24 is preferably a miniature monochromic image which is illuminated by a high-brightness LED. LCD 24 generally displays the thermal image generated by thermal imager 22 as a high-brightness monochromic image.

Spectral beam combiner assembly 16 generally includes a folding mirror 30 and a spectral beam reflector 32. Mirror 30 is positioned generally behind thermal image sight assembly 14. Reflector 32 is positioned generally behind optical gun sight 12 and is in front of exit pupil 20. Mirror 30 is configured to direct the thermal image displayed by LCD 24 to reflector 32. Reflector 32 is configured to reflect light having the wavelength of monochromic image 24 while transmitting all other light. As such, reflector 32 reflects the thermal image displayed by LCD 24 and is a narrow-band spectral beam reflector. As will be described below, reflector 32 reflects the thermal image displayed by LCD 24 and passes the direct view image provided by optical gun sight 12 to exit pupil 20 for operator 18 to see as one fused thermal and direct view image.

In operation of aiming sight 10, thermal imager 22 generates a thermal image of a target scene. Thermal imager 22 generates the thermal image by detecting targets in a target scene having a temperature falling within a temperature range (e.g., between 90° F. and 110° F.) for display as the thermal image. Thermal imager 22 may employ more sophisticated target detection processing. LCD 24 then displays the thermal image as a high-brightness monochromic image.

The thermal image displayed by LCD 24 is viewed through long eye relief eyepiece 26. Long eye relief eyepiece 26 has an eye relief of at least 80 mm. Mirror 30 and reflector 32 function to place the thermal image displayed by LCD 24 in line with optical gun sight 12. By properly choosing (i) the focal length of an imaging lens of the thermal sight of thermal imager 22, (ii) the display size of LCD 24, and (iii) the magnification of eyepiece 26, the thermal image displayed by the LCD is made the same size as the direct view image provided through optical gun sight 12.

By then adjusting the alignment of the thermal sight and/or by adjusting the alignment of mirror 30, operator 18 sees two superimposed images of a target scene by placing his eye at the position of exit pupil 20. The two superimposed images include the direct view image provided by optical gun sight 12 and the thermal image provided by thermal image sight assembly 14. That is, operator 18 sees the direct view image target scene and amber color spots indicating objects in the target scene which have the temperature of human beings (i.e., temperatures falling within the range of 90° F. to 110° F.).

Thermal sight assembly 14 further includes a power supply such as a battery 34. Battery 34 supplies power to thermal imager 22 and its processing electronics and also supplies power to LCD 24. Thermal imager 22 and LCD 24 are set in a standby mode to save the life of battery 34. Operator 18 turns-on thermal imager 22 and LCD 24 by pressing a remote switch or the like. In response to the actuation of the remote switch, thermal imager 22 and LCD 24 instantly turn-on and stay on for a minute or so. Operator 18 generally turns-on thermal imager 22 and LCD 24 when the operator desires to search for hidden or camouflaged targets in a target scene. When operator 18 cues a target from its thermal signature, the operator can turn off thermal sight assembly 14 in order to remove the superimposed thermal image from the direct view image target scene and then concentrate on the target without distraction.

Referring now to FIG. 3, with continual reference to FIG. 2, a conceptual drawing of the fused thermal and direct view aiming sight 10 used with a night-vision scope or goggle 36 for operation of the aiming sight at night is shown. A holographic gun sight 12 has a reticle brightness that can be lowered to a relatively low, night-vision device compatible level. As such, with the use of a holographic gun sight 12, aiming sight 10 can be used with image intensified night-vision scope or goggle 36 for night-time operation. Night-vision scope or goggle 36 is placed at exit pupil 20 of optical gun sight 12 and thermal image sight assembly 14. When an eye of operator 18 is positioned at exit pupil 20, the operator sees through night-vision scope 36 a superimposed light-intensified thermal image generated by thermal image sight assembly 14 and a light-intensified aiming reticle of the direct view image generated by holographic gun sight 12.

The brightness of the LED used to illuminate LCD 24 is lowered to a level suitable for use by night-vision scope 36. This is done so that the light-intensified thermal image seen through night-vision scope 36 has a brightness suitable for viewing by operator 18. The LED brightness may be adjusted by varying the driving voltage and by using pulse-width modulation as taught in U.S. Pat. No. 5,483,362 in order to adjust both the intensity and the duty cycle of the modulated LED. Once again, the thermal image generated by thermal image sight assembly 14 can be used by operator 18 to cue warm targets such as human bodies and the high-resolution light-intensified direct view image generated by holographic gun sight 12 can be used by the operator for target recognition, identification, and aiming.

In either of the configurations shown in FIGS. 2 and 3, LCD 24 and relief eyepiece 26 are attached firmly to optical gun sight 12. Thermal imager 22 with its thermal sight can also be attached to optical gun sight 12 with LCD 24 and eyepiece 26 as an integrated unit. Alternatively, thermal imager 22 with its thermal sight can be mounted forward near the tip of the barrel of a weapon and connected to LCD 24 via a cable (as shown in FIG. 1). In this configuration, LCD 24 receives the video signal indicative of the thermal image generated by thermal imager 22 via the cable. Placing thermal imager 22 at the front will avoid having the heat from the barrel getting into the field of view of thermal imager 22. Such heat could overwhelm the LWIR thermal sensor array.

Figure 4:
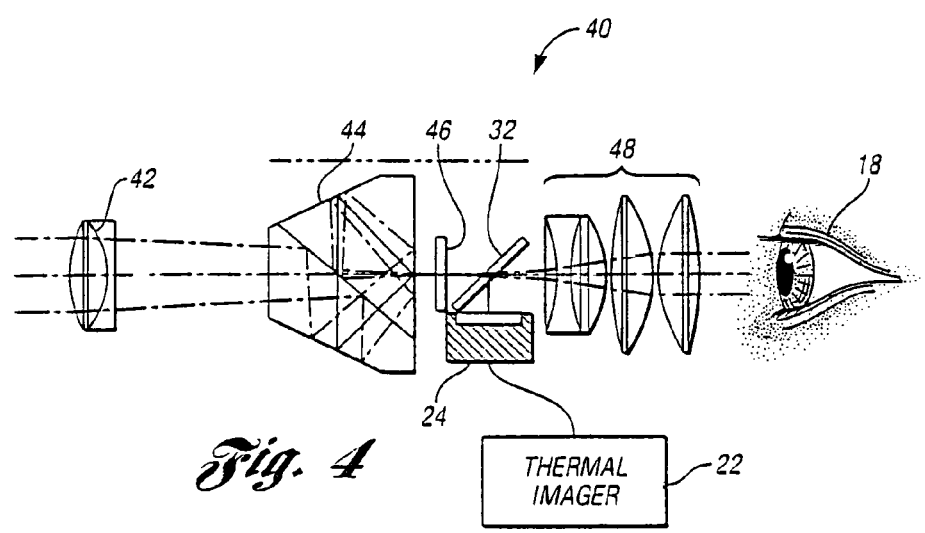
FIG. 4 illustrates a conceptual drawing of the fused thermal and the direct view aiming sight in accordance with another embodiment of the present invention.

Referring now to FIG. 4, a fused thermal and direct view aiming sight 40 in accordance with another embodiment of the present invention is shown. Aiming sight 40 implements the direct view thermal fusion with a rifle scope. As is known in the art, a rifle scope is a magnified optical aiming scope. Similar to aiming sight 10, aiming sight 40 generally includes an optical rifle aiming scope, a thermal sight assembly, and a spectral beam combiner assembly.

As shown in FIG. 4, the optical rifle aiming scope of aiming sight 40 includes an objective lens 42, a Pechan prism 44, a reticle 46, and an eyepiece 48. These elements of the optical rifle aiming scope are configured to generate an aiming reticle superimposed over a direct view image of a target scene for an operator to see. The optical rifle aiming scope is modified such that spectral beam reflector 32 is placed right behind the intermediate image plane where reticle 46 is located. As such, spectral beam reflector 32 is placed between reticle 46 and eyepiece 48 of the optical rifle aiming scope. (In contrast, in aiming sight 10 spectral beam reflector 32 is placed behind optical gun sight 12 as shown in FIGS. 1, 2, and 3.)

In operation, LCD 24 receives a thermal image of a target scene generated by thermal imager 22 and then displays the thermal image as a monochromic image. Reflector 32 receives the thermal image displayed by LCD 24 as the LCD is illuminated by a narrow-band LED. Reflector 32 reflects the thermal image displayed by LCD 24 and superimposes the displayed thermal image over reticle 46 and the intermediate image of the target scene.

The displayed thermal image of LCD 24 is aligned with the direct view image viewed through the optical rifle aiming scope. The optical power of the thermal sight of thermal imager 22 and the size of LCD 24 are chosen to match the power of objective lens 42 of the optical rifle aiming scope such that the image sizes of the intermediate image plane formed by the objective lens and the LCD thermal image formed by LCD 24 are the same. Thermal imager 22 is steered in order to make these two images coincide.

When operator 18 looks through eyepiece 48 of the optical rifle aiming scope, the operator sees the magnified direct image view of the target scene (generated by the optical rifle aiming scope) and superimposed on this direct image view is the monochromic red thermal image view (displayed by LCD 24). By displaying only warm targets within the desired temperature range, operator 18 can use the thermal image view to locate and cue possible camouflaged human and animal targets.

Thus, it is apparent that there has been provided, in accordance with the present invention, a fused thermal and a direct view aiming sight that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An aiming sight comprising:
    an optical gun sight for generating a view of a target scene viewed directly through the optical gun sight without the use of a display screen and for superimposing an aiming reticle on the view of the target scene to generate a direct view image having the aiming reticle superimposed on the view of the target scene;
    a thermal image sight assembly for generating a thermal image of the target scene, wherein the thermal image sight assembly includes a thermal imager, a liquid crystal display illuminated by a narrow-band light emitting diode (LED), and a long eye relief eyepiece; and
    a spectral beam combiner assembly positioned behind the optical gun sight and the thermal image sight assembly and positioned in front of an exit pupil, the spectral beam combiner assembly receives and passes the direct view image from the optical gun sight to the exit pupil and receives and reflects the thermal image from the thermal image sight assembly to the exit pupil such that the thermal image is superimposed onto the direct view image of the optical gun sight for an operator to see as a superimposed thermal and direct view image when the operator positions an eye at the exit pupil;
    wherein the spectral beam combiner assembly includes a folding mirror and a reflector, the folding mirror being generally positioned behind the thermal image sight assembly, the reflector being generally positioned behind the optical gun sight and in front of the exit pupil, wherein the folding mirror receives and reflects the thermal image from the thermal image sight assembly to the reflector, wherein the reflector passes the direct view image from the optical gun sight to the exit pupil and reflects the thermal image from the folding mirror to the exit pupil in order to superimpose the thermal image onto the direct view image of the optical gun sight for the operator to see as a superimposed image composed of a monochromic thermal image and a direct view image of the target scene together with the aiming reticle when the operator positions an eye at the exit pupil;
    wherein the thermal imager generates the thermal image of the target scene, wherein the LCD displays the thermal image as a monochromic image, and wherein the long eye relief eyepiece provides the thermal image displayed by the LCD to the folding mirror of the spectral beam combiner assembly for the folding mirror to reflect to the reflector.

2. The aiming sight of claim 1 wherein:
    the reflector is a narrow-band spectral beam reflector which is tuned to reflect the thermal image received from the folding mirror to the exit pupil while allowing any other light to pass.

3. The aiming sight of claim 1 wherein:
    the thermal imager includes the LED that illuminates the LCD to display the thermal image as the monochromic image, wherein brightness of the LED is controllable in order to match brightness of the thermal image with brightness of the direct view image such that the superimposed thermal and direct view image has an even brightness.

4. The aiming sight of claim 1 wherein:
    the thermal imager is controllable in order to generate the thermal image such that the thermal image includes targets in the target scene which have a temperature falling within a given temperature range and excludes all other targets in the target scene.

5. The aiming sight of claim 1 wherein:
    the thermal imager and the LCD are controllable to be turned-off such that the direct view image provided from the optical sight is passed to the exit pupil without a thermal image superimposed thereon when the thermal imager and the LCD are turned-off.

6. The aiming sight of claim 1 wherein:
    a focal length of the thermal imager, a size of the LCD, and a magnification of the long eye relief eyepiece are selected such that the thermal image is made to be the same angular size as the direct view image in order for the superimposed thermal and direct view image to have an even size.

7. The aiming sight of claim 1 wherein:
    the optical gun sight is a non-magnified reflex optical sight.

8. The aiming sight of claim 1 wherein:
    the optical gun sight is a holographic optical sight in which brightness of the aiming reticle is adjustable.

9. The aiming sight of claim 8 further comprising:
    a night-vision scope positioned at the exit pupil, wherein the night-vision scope light-intensifies the superimposed thermal and direct view image for night-time use of the aiming sight.

10. An aiming sight comprising:
    an optical sight for generating a view of a target scene viewed directly through the optical gun sight without the use of a display screen and for superimposing an aiming reticle on the view of the target scene to generate a direct view image having the aiming reticle superimposed on the view of the target scene;
    a thermal image sight including a thermal imager, a liquid crystal display (LCD) illuminated by a light emitting diode (LED), and a relief eyepiece; and
    a beam combiner positioned behind the optical sight and the thermal image sight and positioned in front of an exit pupil, the beam combiner includes a mirror positioned behind the thermal image sight and includes a reflector positioned behind the optical sight and in front of the exit pupil;
    wherein the thermal imager generates a thermal image of the target scene, the LCD displays the thermal image as a monochromic image, and the relief eyepiece provides the monochromic thermal image to the mirror for the mirror to reflect to the reflector;
    wherein the reflector passes the direct view image from the optical sight to the exit pupil and reflects the monochromic thermal image from the thermal image sight to the exit pupil such that the monochromic thermal image is superimposed onto the direct view image for an operator to see as a superimposed thermal and direct view image of the target scene together with the aiming reticle when the operator positions an eye at the exit pupil.

11. The aiming sight of claim 10 wherein:
    the reflector is tuned to reflect the thermal image received from the mirror to the exit pupil while allowing any other light to pass.

12. The aiming sight of claim 10 wherein:
    the thermal imager includes the LED, wherein brightness of the LED is controllable to match brightness of the thermal image with brightness of the direct view image such that the superimposed thermal and direct view image has an even brightness.

13. The aiming sight of claim 10 wherein:

the thermal imager is controllable to generate the thermal image such that the thermal image includes targets in the target scene which have a temperature falling within a given temperature range and excludes all other targets in the target scene.

14. The aiming sight of claim 10 wherein:

the thermal imager and the LCD are controllable to be turned-off such that the direct view image provided from the optical sight is passed to the exit pupil without a thermal image superimposed thereon when the thermal imager and the LCD are turned-off.

15. The aiming sight of claim 10 wherein:

a focal length of the thermal imager, a size of the LCD, and a magnification of the relief eyepiece are selected such that the thermal image is made to be the same angular size as the direct view image for the superimposed thermal and direct view image to have an even size.

16. The aiming sight of claim 10 wherein:

the optical sight is a non-magnified reflex optical sight.

17. The aiming sight of claim 10 wherein:

the optical sight is a holographic optical sight in which brightness of the aiming reticle is adjustable.

18. The aiming sight of claim 17 further comprising:

a night-vision scope positioned at the exit pupil, wherein the night-vision scope light-intensifies the superimposed thermal and direct view image for night-time use of the aiming sight.

* * * * *

UNITED STATES PATENT AND TRADEMARK OFFICE
CERTIFICATE OF CORRECTION

PATENT NO.      : 7,319,557 B2
APPLICATION NO. : 11/043627
DATED           : January 15, 2008
INVENTOR(S)     : Anthony M. Tai Page 1 of 1

It is certified that error appears in the above-identified patent and that said Letters Patent is hereby corrected as shown below:

Column 7, Line 12, Claim 1:

After "display" insert -- (LCD) --.

Signed and Sealed this

Twentieth Day of May, 2008

JON W. DUDAS
*Director of the United States Patent and Trademark Office*